J. H. PORTMAN.
WRIST PIN.
APPLICATION FILED JULY 21, 1913.
1,154,883.
Patented Sept. 28, 1915.
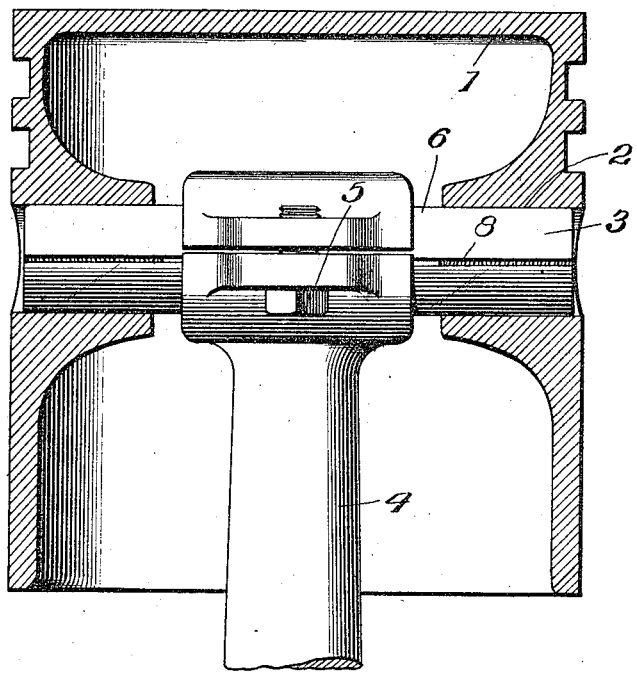
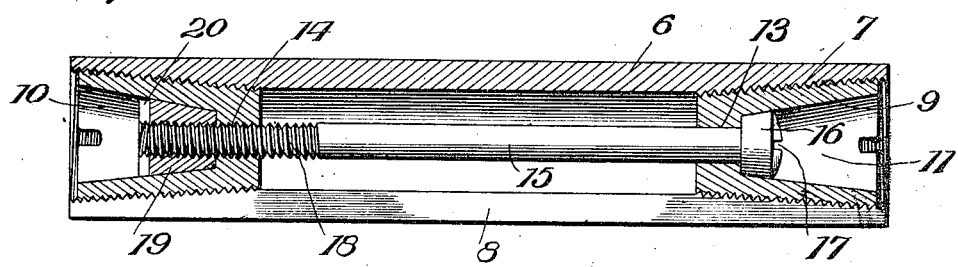
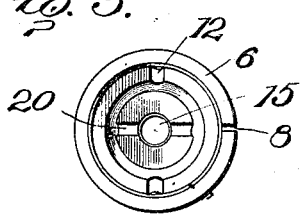
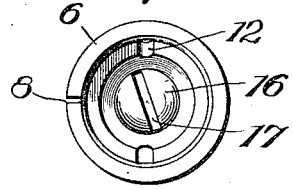
Inventor
John H. Portman
Witnesses
By
Attorneys

UNITED STATES PATENT OFFICE.

JOHN H. PORTMAN, OF PASCAGOULA, MISSISSIPPI.

WRIST-PIN.

1,154,883.

Specification of Letters Patent.

Patented Sept. 28, 1915.

Application filed July 21, 1913. Serial No. 780,319.

*To all whom it may concern:*

Be it known that I, JOHN H. PORTMAN, a citizen of the United States, residing at Pascagoula, in the county of Jackson and State of Mississippi, have invented certain new and useful Improvements in Wrist-Pins, of which the following is a specification.

This invention relates to wrist pins for use in gasolene, naphtha, oil, alcohol, kerosene and steam engines, and it has as its primary object to provide a wrist pin which may be readily and quickly expanded so as to take up wear.

It is one aim of the invention to so construct the wrist pin that after it has been expanded, its expanding cones may be securely and firmly locked against displacement.

In the accompanying drawings: Figure 1 is a view illustrating the pin in elevation and arranged within a piston head. Fig. 2 is a vertical longitudinal sectional view through the pin. Fig. 3 is an end elevation of the pin. Fig. 4 is a similar view looking at the other end thereof.

Corresponding and like parts are referred to in the following description and indicated in all the views of the accompanying drawings by the same reference characters.

In the drawings the numeral 1 indicates a piston head, such as employed in explosive engines, and this head is provided at diametrically opposite points with the usual bearings 2 in which are fitted the ends of the wrist pin, embodying the present invention, the said pin being indicated in general by the numeral 3.

The numeral 4 indicates the piston rod, which at its end is provided with the usual slit collar portion receiving the intermediate portion of the pin, this collar portion being clamped to the pin by means of a set-bolt 5, as clearly shown in Fig. 1 of the drawings.

The wrist pin embodying the present invention consists essentially of a tubular exteriorly cylindrical body 6 which is interiorly tapered from each end for a short distance, as indicated at 7, the walls of the tapered portions being threaded as clearly shown in Fig. 2. The pin is split longitudinally as indicated at 8, so that it may be expanded at all points in its length and in order that the pin may be expanded so as to take up wear of its ends or of the bearings 2, means is provided which will now be described.

The expanding means mentioned above, consists in part of two expanding cones, one indicated by the numeral 9 and the other by the numeral 10. Both of these members are frusto-conical in form and both are hollow or recessed as indicated at 11, the wall of the recess of each cone corresponding approximately to the taper of the exterior wall or surface of the cone. The cones are exteriorly threaded and the major end of each cone is formed with diametrically oppositely located notches 12 which adapt the cones for the application thereto of a spanner wrench, whereby they may be fitted into one end or the other of the tubular body 6. It will be observed that the cones are exteriorly threaded and that they are formed to fit within the threaded ends of the body 6. It will now be apparent that when the cones are fitted within the opposite ends of the body 6 and are turned by means of a suitable spanner wrench, they will expand the body 6 to a greater or less degree so as to take up wear. The minor end of the cone 9 is formed with an opening 13 and the corresponding end of the cone 10 is formed with an opening 14. The wall of the opening 13 is plain, whereas the wall of the opening 14 is threaded.

The invention contemplates the provision of means for securely and firmly locking the expanding cones 9 and 10 in adjusted positions, and this means consists in part of a bolt 15 which is fitted through the opening 13 and has a conical head 16 seating in the minor end of the recess 11 in the said cone. This head of the bolt is formed with a transversely extending notch 17 to receive the bit of a screw-driver, whereby the bolt may be rotated. The other end of the bolt shank is threaded as indicated at 18, and is fitted through the opening 14, it being understood that the head 16, when the bolt is tightened, will bear against the inner or bottom wall of the recess 11, which together with the engagement of the head 18 with the threads 14 enables the bolt to hold the expanding cones against backward rotation and against separation or movement away from each other. In order that the bolt may be locked in place, there is provided a conical locking nut 19 which is threaded onto that end of the bolt which projects into the recess 11 in the expanding cone 10, and this nut is provided in its major end at diametrically opposite points with notches 20 for engagement of a spanner wrench or the bit of a screw-driver, whereby the nut may be tightened. By reference to Fig. 2 of the drawings, it will be observed that the nut 19 fills the inner or minor end of the recess in the said cone 10 and, consequently, the minor end of the nut abuts against the inner wall of the recess and serves effectually to strengthen the threaded engagement of the bolt through the minor end of the cone.

From the foregoing description of the invention and from an inspection of the drawings, it will be understood that when it is necessary to expand the pin so as to take up wear, the lock nut 19 and bolt 15 are loosened and the expanding cones 9 and 10 are further threaded into the ends of the pin until the pin has been expanded to the desired degree. The bolt 15 is then tightened as is also the nut 19.

Having thus described the invention what is claimed as new is:

1. In an expansible wrist pin, a split tubular body, expanding cones fitted in the ends of the body, and a bolt fitted through the said cones and extending axially of the body.

2. In an expansible wrist pin, a split tubular body, expanding cones fitted in the ends of the body, a bolt fitted through the said cones and having a head at one end bearing against one of the cones, and a nut threaded upon the bolt at the other end thereof and bearing against the other cone.

3. In an expansible wrist pin, a split tubular body, expanding cones fitted in the ends of the body, the said cones being formed each with a conical recess, a bolt fitted through the minor ends of the cones and provided at one end with a conical head fitting in the recess in one of the cones, and a nut threaded upon the other end of the bolt and of conical form and seating in the recess in the other cone.

4. In an expansible wrist pin, a split tubular body, expanding cones fitted in the ends of the body, the body at its ends being interiorly threaded and conical and the cones being exteriorly threaded, the cones being provided at their outer ends with means for the engagement of a wrench or the like, whereby they may be adjusted within the ends of the body, and a tie-bolt extending between the cones and provided with a nut adjustable thereon to lock the cones after adjustment.

5. In an expansible wrist pin, a split tubular body interiorly flared at its opposite ends and having the walls of its flared portions threaded, an expanding cone threaded into each end of the body, each cone being provided in its major end with a tapered seat, a tie bolt fitted through the minor ends of the cones and having a conical head fitting the tapered seat of one cone, and a conical nut threaded onto the other end of the tie bolt and seating within the conical seat in the other cone.

In testimony whereof I affix my signature in presence of two witnesses.

JOHN H. PORTMAN. [L. S.]

Witnesses:
 MARTIN HASS,
 L. W. OHR.